United States Patent [19]

Jones

[11] 3,708,137
[45] Jan. 2, 1973

[54] CHANGING HAND FISHING REEL

[76] Inventor: Cyril W. Jones, 3100 Warm Springs Ave., Boise, Idaho 83702

[22] Filed: May 13, 1971

[21] Appl. No.: 142,988

[52] U.S. Cl. ............................. 242/219, 242/84.5 R
[51] Int. Cl. ............................................. A01k 89/00
[58] Field of Search ....242/84.51 R, 84.5 R, 99, 212, 242/213, 214, 218, 219

[56] References Cited

UNITED STATES PATENTS

| 3,591,107 | 7/1971 | Ferguson | 242/219 |
| 3,478,978 | 11/1969 | Nurmse | 242/84.51 R |
| 3,572,607 | 3/1971 | Wilson | 242/219 |
| 2,180,566 | 11/1939 | Thompson | 242/84.51 R |

*Primary Examiner*—Billy S. Taylor
*Attorney*—John W. Kraft

[57] ABSTRACT

The fishing reel of the invention includes a line crank winding assembly having an axle in operative communication with the spool of the reel. The spool and the axle are provided with a disc-type, slip clutch having manual adjustment means to limit the tension placed on the line. A housing is disposed between the crank winding assembly and the reel. The wall of the crank winding assembly is provided with an eliptical arcuate-shaped ledge adjacent the housing and a hand control means distally disposed above the ledge and threadably carried in the wall of the crank winding assembly. The wall of the housing adjacent the crank winding assembly is provided with an annular ring so that the wall of the housing is recessed. A disc is carried on the ledge between the walls of the crank assembly and the housing. The control means threadably carried by the wall of the crank assembly is normally in the path of the disc. When the disc is adjacent the control means the disc may rotate between the ledge and the annular ring of the housing in response to rotation of the crank winding assembly in one direction. When the crank winding assembly is rotated in a direction opposite, the disc tends to wedge between the ledge and the annular ring thus being operable as a brake. By removing the control means from the path of the disc, the disc may be moved to the side opposite with respect to the control means, thus providing means by which the reel may be selectively operated by persons having right and left hand dominant dexterity without disassembly of the reel of this invention.

3 Claims, 9 Drawing Figures

CYRIL W. JONES  INVENTOR.

CYRIL W. JONES INVENTOR

CHANGING HAND FISHING REEL

FIELD OF INVENTION

This invention relates to fishing reels and more particularly to fishing reels commonly referred to as casting and fly type reels adapted to be operated selectively either by persons having right or left hand dominant dexterity.

BRIEF DESCRIPTION OF THE PRIOR ART:

Casting and fly type reels known in the prior art use and employ gear-like ratchet control means suitably fastened to the hub, axle or core of the reel operating mechanism. Since such means are of small diameters, substantially strong material must be used to fabricate such parts and a degree of manual strength and agility is required in their use. Usually such structures are complex and are difficult to maintain except by those especially skilled in the art of manufacturing and assembling fishing reels.

Accordingly, it is an extremely important object of this invention to provide a fishing reel having few operating parts which may easily and readily be assembled and disassembled for maintenance and cleaning by novices to the art.

Another object of this invention is to provide in a fishing reel means operable to selectively change the operating mechanism to right or left hand operation.

These and other objects shall become apparent from the description following, it being understood that modifications may be made without affecting the teachings of the invention here set out.

Generally, the fishing reel of the invention includes a line crank winding assembly having an axle in operative communication with a reel. The reel and the axle are provided with a "slip" clutch arrangement commonly referred to in the art as a star drag. A housing is disposed between the crank winding assembly and the reel. The wall of the crank winding assembly is provided with an eliptical arcuate-shaped ledge adjacent the housing and a hand control means distally disposed above the ledge and threadably carried in the wall of the crank winding assembly. The wall of the housing adjacent the crank winding assembly is provided with an annular ring so that the wall of the housing is recessed. A disc is carried on the ledge between the walls of the crank assembly and the housing. The control means threadably carried by the wall of the crank assembly is normally in the path of the disc. When the disc is adjacent the control means the disc may rotate between the ledge and the annular ring of the housing in response to rotation of the crank winding assembly in one direction. When the crank winding assembly is rotated in a direction opposite, the disc tends to wedge between the ledge and the annular ring thus being operable as a brake. By removing the control means from the path of the disc, the disc may be moved to the side opposite with respect to the control means, thus providing means by which the reel may be selectively operated by persons having right and left hand dominant dexterity without disassembly of the reel of this invention.

A more thorough and comprehensive understanding may be had from the detailed description of the preferred embodiment when read in connection with the drawings forming a part of this specification.

Figure 1:
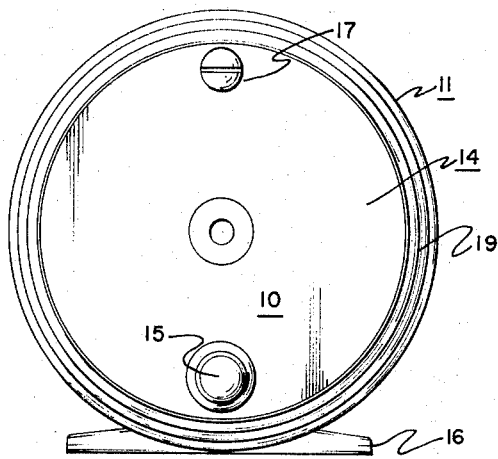
FIG. 1 is a side elevational view of the fishing reel of the present invention showing to advantage the crank winding assembly and the hand control means.
Figure 2:
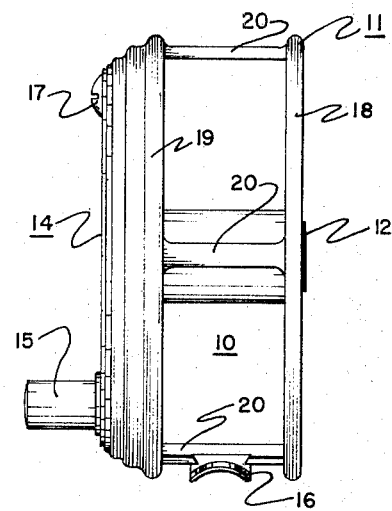
FIG. 2 is an end elevational view of the reel of this invention.
Figure 3:
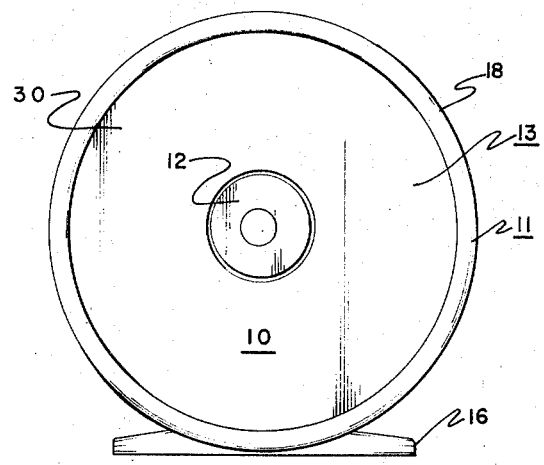
FIG. 3 is a side elevational view of the side opposite the FIG. 1 showing the brake-drag control.

DESCRIPTION OF THE PREFERRED EMBODIMENT:

Referring now to the drawings and more particularly to the FIGS. 1, 2, and 3, the fishing reel of the present invention is shown to advantage and identified generally by the numeral 10. The reel 10 includes a reel housing 11, a line drag control knob 12, reel line assembly or spool 13, a line crank winding assembly 14 having a handle 15, a pole mounting base 16, and a hand control means 17. The housing 11 is provided with an annular reel mounting frame 18 distally disposed from an upstanding wall portion 19. Although the frame 18 is here shown carried by a multiplicity of outwardly projecting support arms 20 disposed between the wall 19 and the annular frame 18, it is to be understood that the wall 19 and the frame 18 may comprise an integral housing having an exitway or opening through which a fishing line may pass from the reel line assembly 13. The crank winding assembly 14 is journaled for rotation through the frame 18, and in the reel assembly 13. The crank winding assembly 14 is provided with a reel axle portion 21 which is in operative communication with the hub assembly 22 and a commonly known "star" drag assembly 23 hereinafter later described.

Referring now to the FIGS. 4, 5, 6, and 7, the operating assemblies of the invention are shown to advantage. The line crank winding assembly 14 comprises an upstanding wall 24, a hand control ledge 25, an outwardly projecting tubular axle portion 21 having a pair of opposing slots 26 and a crank handle 15. A hand control disc 27 is carried on the ledge 25 and is normally disposed between the upstanding wall 24 of the line crank winding assembly 14 and the wall 19 of the reel housing 11. The ledge is an eliptically arcuate-shaped portion distally disposed on the portion of the wall 24 adjacent the wall 19. The wall 19 of the reel housing 11 includes an annular ring 28 about the peripheral terminal edge of the wall 19 so that the wall 19 is recessed. Hence the disc 27 is carried between the ledge 25 and the annular ring 28. The hand control means 17 as here disclosed is a screw threadably carried in the wall 24 distally above the ledge 25 and in the path of the disc 27. In operation the disc 27 may freely rotate between the annular ring 28, the reel housing 11, and the ledge 25 when the disc 27 is adjacent the hand control means 17 in response to rotation of the line crank winding assembly 14. When the line crank winding assembly 14 is rotated in a direction opposite tending to move the disc 27 away from the hand control means 17, the disc 27 tends to become wedged between the outermost terminal end of the ledge 25 of the crank winding assembly 14 and the annular ring 28 of the wall 19 of the housing 11. Hence, the disc 11 tends to act as a brake means.

Figure 4:
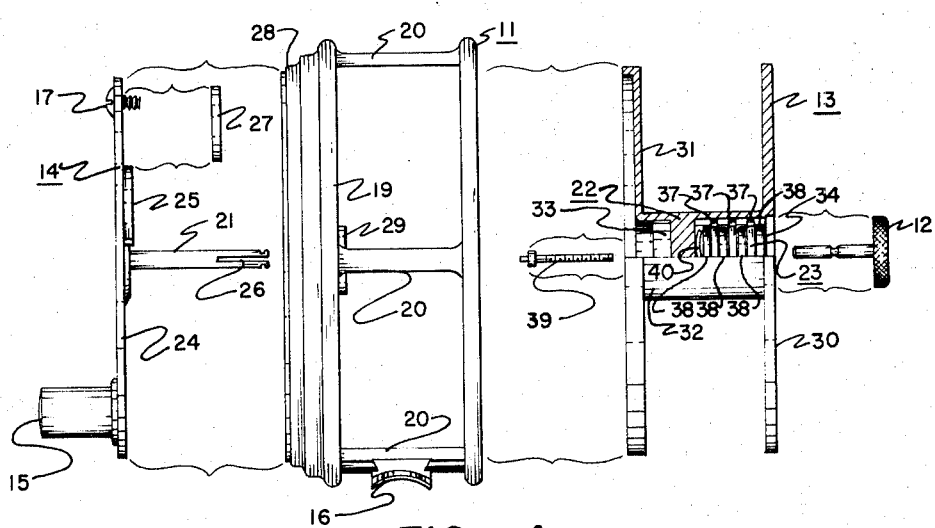
FIG. 4 is an exploded side elevational view of the reel of this invention showing to advantage the crank winding assembly including the hand control means and disc, the reel housing and the line reel assembly.
Figure 5:
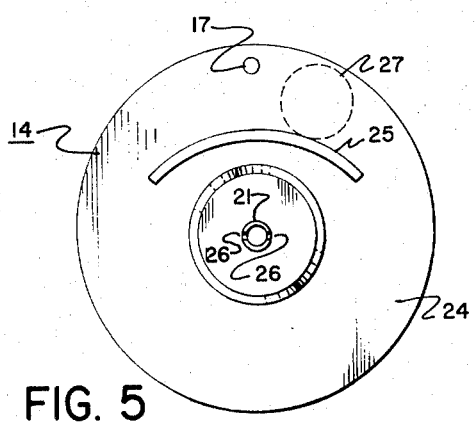
FIG. 5 is a side elevational view of the crank winding assembly as viewed from the side opposite FIG. 1.

The FIG. 5 shows to advantage the disc 27 positioned on the ledge 25 for a left hand forward operation, as the reel would be operated by a person having dominant left hand dexterity. Particular novelty taught by the structure disclosed here is that by loosening the screw 17 so that it is out of the path of disc 27 and rotating the line crank winding assembly 14 the disc tends to be moved on the ledge 25 past the control means 17, then tightening the screw control means 17 in the wall 24 and into the path of the disc 27 the reel may be forwardly operated in a direction opposite by a person of dominant right hand dexterity without disassembly of the reel 10. It is to be understood that the reel 10 would then be mounted on a pole at 180° to that shown in the FIG. 4.

Figure 6:
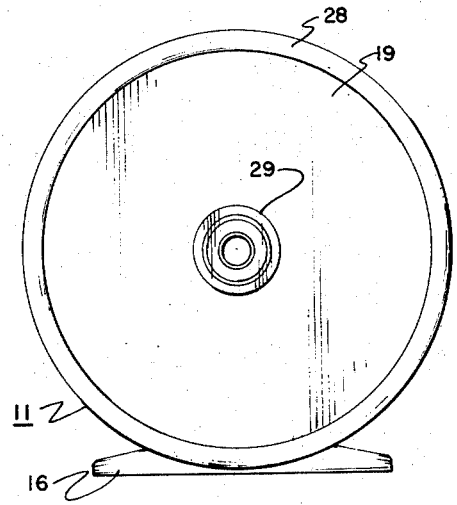
FIG. 6 is a side elevational view of the reel housing having the line reel assembly removed.

FIG. 6 shows to advantage the reel housing 11 with the reel removed as viewed from the side normally adjacent the reel 13. In practice it has been found to advantage to provide a bearing 29 suitably mounted in the centermost portion of the wall 19 of the housing 11 to carry the reel axle portion 21.

Figure 7:
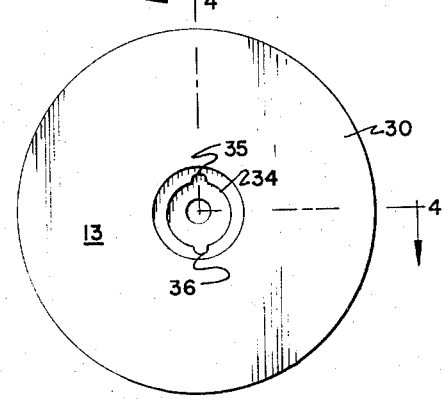
FIG. 7 is a side elevational view of the reel housing as viewed from the side opposite FIG. 6.
Figures 8, 9:
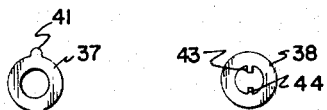
FIG. 8 is a plan view of a typical reel housing internal stop washer member.
FIG. 9 is a plan view of a typical crank winding drag external washer member.

Referring again to the FIG. 4, the reel line assembly 13 is shown to advantage including a cross sectional portion taken substantially along the lines 4—4 of the FIG. 7 hereinafter later described. The reel assembly 13 comprises a pair of upstanding walls 30 and 31 having a hub portion 32 disposed therebetween. The hub portion 32 is provided with a recess portion 33 operable to be carried on the outermost terminal edge of the bearing 29, and a drag receiving portion 34 shown to advantage in the FIG. 7. The drag receiving portion 34 is provided with a pair of opposing slots 35 and 36. The FIG. 4 shows to advantage a multiplicity of internal washer-like members 37 and external washer-like members 38 alternately disposed in the portion 34 of the hub 32. The members 37 and 38 are shown drawn to a larger scale in the FIGS. 8 and 9. A substantially T-shaped bolt 39 adapted to be received in the slots 26 of the reel axle portion 21 carries the members 37 and 38. A deformed resilient spring washer 40 is carried on the bolt 39 adjacent the transverse portion of the bolt 39. The members 37 are retained in the portion 34 engaging the outwardly projecting prongs 41 and 42 provided on the members 37 in the respective slots 35 and 36 of the portion 34 of the reel 13. The members 38 are retained in engagement with respective slots 26 of the portion 21 by inwardly projecting prongs 43 and 44 of the members 38. Hence, the members 38 tend to move with the portion 21 while the members 37 tend to move with the reel 13. The control knob 12 is in communication with the wall 31 of the reel 13 and is threadably carried by the bolt 39. As the knob 12 is tightened on the bolt 39 the members 37 and 38 frictionally tend to be moved in opposing directions, thereby creating drag upon the reel 13 by tending to frictionally inhibit opposing movement of the reel 13 from the position of the crank assembly 14 which is normally locked from reverse movement by the disc 27 as herein earlier described. Such drag control means is commonly known in the art as a "star" drag.

Having thus described in detail a preferred apparatus which embodies the concepts and principles of the invention and which accomplishes the various objects, purposes and aims thereof, it is to be appreciated and will be apparent to those skilled in the art that many physical changes could be made in the apparatus without altering the inventive concepts and principles embodied therein. Hence, it is intended that the scope of the invention be limited only to the extent indicated in the appended claims.

I claim:

1. A changing hand fishing reel comprising a spool, a housing, and a crank winding assembly, said spool including a pair of opposing upstanding walls having a substantially tubular hub portion disposed therebetween, said housing including an upstanding wall and an annular ring spaced apart by a body portion, said body portion including an exitway through which a fishing line carried by said spool may pass, said upstanding wall having an outwardly projecting annular ring suitably fastened to the terminal edge of the wall on the side opposite said body portion, said crank winding assembly comprising an upstanding wall, an outwardly projecting shaft suitably fastened to one side of said winding assembly wall, an eliptically shaped arcuate ledge distally disposed radially outward of said shaft, a disc carried on said ledge between said crank winding assembly wall and said housing wall, hand control means normally carried by said crank winding assembly wall being disposed distally radially outward of the centermost portion of said ledge in the path of said disc, said shaft being normally in operative communication with said spool, means connecting said shaft to said spool, said shaft and said spool being journaled for rotation in said housing, said crank winding assembly including a crank handle mounted distally from the terminal edge on the side opposite said shaft of said wall, said disc being operable to rotate on said ledge in response to rotation in one direction of said crank winding assembly and to wedge between said ledge of said crank winding assembly and said annular ring of said housing wall in response to rotation in the direction opposite of said crank winding assembly, said hand control means being operable to permit said disc to be selectively moved from one side of said control means to the side opposite to permit operation of the reel for persons having right and left hand dominant dexterity.

2. The apparatus of claim 1 in which said hand control means comprises a bolt threadably carried in said crank winding assembly wall.

3. The apparatus of claim 2 including a substantially cylindrical disc-like projecting portion in the centermost portion of said wall of said housing adapted to operatively engage said hub of said spool.

* * * * *